United States Patent
Messana et al.

(10) Patent No.: US 9,167,427 B2
(45) Date of Patent: Oct. 20, 2015

(54) METHOD OF PROVIDING USER EQUIPMENT WITH ACCESS TO A NETWORK AND A NETWORK CONFIGURED TO PROVIDE ACCESS TO THE USER EQUIPMENT

(71) Applicant: Alcatel Lucent, Paris (FR)

(72) Inventors: Salvatore Messana, Morris Plains, NJ (US); Paul Rominski, Morris Plains, NJ (US); Raymond Johnson, Brick, NJ (US); Dheena Moongilan, Marlboro, NJ (US); Laurent Thiebaut, Antony (FR); John Cladianos, San Francisco, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 242 days.

(21) Appl. No.: 13/836,901

(22) Filed: Mar. 15, 2013

(65) Prior Publication Data

US 2014/0273958 A1    Sep. 18, 2014

(51) Int. Cl.
*H04L 29/06*    (2006.01)
*H04W 12/06*   (2009.01)
*H04W 12/04*   (2009.01)
*H04W 36/00*   (2009.01)
*H04W 76/02*   (2009.01)

(52) U.S. Cl.
CPC .......... *H04W 12/06* (2013.01); *H04L 63/0884* (2013.01); *H04W 12/04* (2013.01); *H04W 36/0033* (2013.01); *H04W 76/02* (2013.01); *H04L 2463/061* (2013.01)

(58) Field of Classification Search
CPC ..... H04W 12/06; H04W 12/04; H04W 76/02; H04W 36/0033; H04L 63/0884; H04L 2463/061
USPC ............. 713/171, 175, 153, 156, 185; 726/12
See application file for complete search history.

(56) References Cited

U.S. PATENT DOCUMENTS 8,356,343 B1 *  1/2013  Breau et al. ...................... 726/12
8,477,945 B2 *  7/2013  Falk et al. ...................... 380/273

(Continued)

OTHER PUBLICATIONS

International Search Report and Written Opinion dated Jul. 8, 2014.

(Continued)

*Primary Examiner* — David García Cervetti
(74) *Attorney, Agent, or Firm* — Harness, Dickey & Pierce, P.L.C.

(57) ABSTRACT

The method of operating a network includes receiving, by an authentication, authorization and accounting (AAA) proxy of the network, authentication information for user equipment from a first wireless access point, the AAA proxy being a proxy for an authentication, authorization and accounting (AAA) server in a radiocommunication network, transmitting, by the AAA proxy, at least the received authentication information to the radiocommunication network, receiving, by the AAA proxy, first key information from the radiocommunication network, generating, by the AAA proxy, second key information based on the first key information and third key information based on the second key information, storing, by the AAA proxy, the first and second key information, and transmitting, by the AAA proxy, the third key information to the first wireless access point, the third key information allowing the user equipment access to a network via the first wireless access point.

22 Claims, 9 Drawing Sheets

(56) References Cited

U.S. PATENT DOCUMENTS

| | | | |
|---|---|---|---|
| 2007/0060097 A1* | 3/2007 | Edge et al. | 455/404.1 |
| 2007/0067834 A1* | 3/2007 | Saito | 726/9 |
| 2007/0297377 A1* | 12/2007 | McCann et al. | 370/338 |
| 2008/0270794 A1* | 10/2008 | Falk et al. | 713/168 |
| 2008/0285749 A1* | 11/2008 | Suh et al. | 380/45 |
| 2008/0295154 A1* | 11/2008 | Suh et al. | 726/4 |
| 2008/0298595 A1* | 12/2008 | Narayanan et al. | 380/278 |
| 2008/0310349 A1* | 12/2008 | Ulupinar et al. | 370/328 |
| 2009/0054037 A1* | 2/2009 | Kaippallimalil | 455/411 |
| 2009/0059864 A1* | 3/2009 | Suh et al. | 370/331 |
| 2009/0092099 A1* | 4/2009 | Gu et al. | 370/331 |
| 2009/0116651 A1* | 5/2009 | Liang et al. | 380/278 |
| 2009/0193253 A1* | 7/2009 | Falk et al. | 713/171 |
| 2009/0280776 A1* | 11/2009 | Chen et al. | 455/411 |
| 2009/0282238 A1* | 11/2009 | Bichot et al. | 713/155 |
| 2009/0307483 A1* | 12/2009 | Falk et al. | 713/153 |
| 2009/0313466 A1* | 12/2009 | Naslund et al. | 713/155 |
| 2010/0008300 A1* | 1/2010 | Wu et al. | 370/328 |
| 2010/0228980 A1* | 9/2010 | Falk et al. | 713/171 |
| 2012/0084568 A1* | 4/2012 | Sarikaya et al. | 713/176 |
| 2013/0091552 A1* | 4/2013 | Cheng et al. | 726/4 |
| 2013/0298209 A1* | 11/2013 | Targali et al. | 726/6 |

OTHER PUBLICATIONS

"3rd Generation Partnership Project; Technical Specification Group Servces and System Aspects; 3GPP System to Wireless Local Area Network (WLAN) Interworking; System Description (Release 10)", 3GPP Standard; 3GPP TS 23.234, 3rd Generation Partnership Project (3GPP), Mobile Competence Centre; 650, Route Des Lucioles; F-06921 Sophia-Antipolis Cedex, France, No. V10.0.0, Mar. 29, 2011, pp. 1-84, XP050476487.

* cited by examiner

METHOD OF PROVIDING USER EQUIPMENT WITH ACCESS TO A NETWORK AND A NETWORK CONFIGURED TO PROVIDE ACCESS TO THE USER EQUIPMENT

BACKGROUND

1. Field

One or more example embodiments relate to a method of providing user equipment with access to a network and/or a network configured to provide access to the user equipment.

2. Description of the Related Art

Mobile devices can connect to a wireless communication network through a plurality of base stations in a radiocommunication network or through wireless access points in a local area network. Typically, mobile devices access the wireless communication network through base stations while roaming. In dense urban areas, these base stations provide access to a large number of mobile devices and the mobile data traffic volume requires a significant amount of resources. Wireless access points can be used to assist in offloading the mobile data traffic volume. However, switching between a first wireless access point and a second wireless access point, with intermediate usage of the radiocommunication network, creates additional signaling during authentication. More efficient methods of accessing the wireless communication network and authenticating the mobile devices are desired.

SUMMARY

At least one example embodiment is directed to a method of providing user equipment with access to a network and/or a network configured to provide access to the user equipment.

According to at least one example embodiment, a method of providing user equipment with access to a wireless access point, the method includes receiving, by an authentication, authorization and accounting (AAA) proxy of the network, authentication information for user equipment from a first wireless access point, the AAA proxy being a proxy for an authentication, authorization and accounting (AAA) server in a radiocommunication network; transmitting, by the AAA proxy, at least the received authentication information to the radiocommunication network; receiving, by the AAA proxy, first key information from the radiocommunication network; generating, by the AAA proxy, second key information based on the first key information and third key information based on the second key information; storing, by the AAA proxy, the first and second key information; and transmitting, by the AAA proxy, the third key information to the first wireless access point, the third key information allowing the user equipment access to a network via the first wireless access point.

The method may include initializing and starting, by the AAA proxy, a timer upon receiving notice that the user equipment is no longer connected to the first wireless access point; and deleting, by the AAA proxy, the first key information if the timer expires.

The method may include receiving, by the AAA proxy, the authentication information for the user equipment from a second wireless access point; and transmitting, by the AAA proxy, the third key information to the second wireless access point if the timer has not expired, the third key information allowing the user equipment access to the network via the second wireless access point.

The method may include storing, by a wireless access gateway, IP connectivity data for the user equipment; and initializing and starting a timer, by at least one of the AAA proxy and the wireless access gateway, upon receiving notice that the user equipment is no longer connected to the first wireless access point.

The method may include receiving, by the AAA proxy, the authentication information for the user equipment from a second wireless access point; transmitting, by the AAA proxy, the third key information to the second wireless access point if the timer has not expired, the third key information allowing the user equipment access to the network via the second wireless access point; and transmitting, by the wireless access gateway, the IP connectivity data to the user equipment via the second wireless access point if the authentication information for the user equipment is received from the second wireless access point and the timer is not expired, the IP connectivity data allowing the user equipment to maintain the same IP address.

According to at least one example embodiment, a network includes an authentication, authorization and accounting (AAA) proxy configured to receive authentication information for user equipment from a first wireless access point, to transmit at least the received authentication information to an authentication, authorization and accounting (AAA) server in a radiocommunication network, to receive first key information from the AAA server in the radiocommunication network, to generate second key information based on the first key information and third key information based on the second key information, to store the first and second key information, and to transmit the third key information to the first wireless access point, the third key information allowing the user equipment access to a network via the first wireless access point, the AAA proxy being a proxy for the AAA server in the radiocommunication network.

The AAA proxy may be further configured to initialize and start a timer upon receiving notice that the user equipment is no longer connected to the first wireless access point, and to delete the first key information if the timer expires.

The AAA proxy may be further configured to receive the authentication information for the user equipment from a second wireless access point, and to transmit the third key information to the second wireless access point if the timer has not expired, the third key information allowing the user equipment access to the network via the second wireless access point.

The network may also include a wireless access gateway configured to store IP connectivity data for the user equipment.

The AAA proxy may be configured to receive the authentication information for the user equipment from a second wireless access point and to transmit the third key information to the second wireless access point if the timer has not expired, the third key information allowing the user equipment access to the network via the second wireless access point, and the wireless access gateway may be configured to transmit the IP connectivity data to the user equipment via the second wireless access point if the authentication information for the user equipment is received from the second wireless access point and the timer is not expired, the IP connectivity data allowing the user equipment to maintain the same IP address.

According to at least one example embodiment, a method of providing user equipment with access to a wireless access point includes sending, by the wireless access point, first authentication information for the user equipment to an authentication, authorization and accounting (AAA) proxy of a first network, the AAA proxy being a proxy for an authentication, authorization and accounting (AAA) server in a radiocommunication network, the radiocommunication network separate from the first network; receiving, by the wireless access point, key information from the AAA proxy if the first authentication information matches second authentication information stored in the AAA proxy; and providing, by the wireless access point, the user equipment with access to the first network via the wireless access point upon receiving the key information, the wireless access point being part of the first network and the first network extending beyond the wireless access point.

The method may include notifying, by the wireless access point, the AAA proxy if the user equipment is no longer connected to the wireless access point.

The method may include communicating, by the wireless access point, with the AAA server in the radiocommunication network via the AAA proxy if the second authentication information for the user equipment is not stored in the AAA proxy, the radiocommunication network separate from the first network.

The method may include receiving, by the wireless access point, IP connectivity from a wireless access gateway if the first authentication information matches the second authentication information stored in the AAA proxy.

The method may include providing, by the wireless access point, the user equipment with access to a second network if the wireless access point determines that the first authentication information for the user equipment matches third authentication information for the second network, the second network being associated with the wireless access point, the third authentication information being different than the second authentication information; and restricting, by the wireless access point, access by the user equipment to the first network and the second network if the first authentication information for the user equipment does not match at least one of the second authentication information and the third authentication information.

According to at least one example embodiment, a wireless access point is configured to send first authentication information for user equipment to an authentication, authorization and accounting (AAA) proxy of a first network, the AAA proxy being a proxy for an authentication, authorization and accounting (AAA) server in a radiocommunication network, the radiocommunication network separate from the first network, receive key information from the AAA proxy if the first authentication information matches second authentication information, and provide the user equipment with access to the first network via the wireless access point upon receiving the key information, the first network extending beyond the wireless access point.

The wireless access point may be configured to notify the AAA proxy if the user equipment is no longer connected to the wireless access point.

The wireless access point may be configured to communicate with the AAA server in the radiocommunication network via the AAA proxy if the second authentication information for the user equipment is not stored in the AAA proxy, the radiocommunication network separate from the first network.

The wireless access point may be configured to receive IP connectivity from a wireless access gateway if the first authentication information matches the second authentication information stored in the AAA proxy.

The wireless access point may be configured to provide the user equipment with access to a second network if the wireless access point determines that the first authentication information for the user equipment matches third authentication information for the second network, the second network being associated with the wireless access point, the third authentication information being different than the second authentication information; and restrict access by the user equipment to the first network and the second network if the first authentication information for the user equipment does not match at least one of the second authentication information and the third authentication information.

According to at least one example embodiment, a method of providing user equipment with access to a wireless access point, the method includes receiving, by an authentication, authorization and accounting (AAA) proxy of the network, authentication information for user equipment from a wireless access point, the AAA proxy being a proxy for an authentication, authorization and accounting (AAA) server in a radiocommunication network; generating, by the AAA proxy, key information based on stored key information associated with the user equipment; and transmitting, by the AAA proxy, the key information to the wireless access point, the key information allowing the user equipment access to a network via the wireless access point, wherein the AAA proxy does not transmit information to the AAA server in the radiocommunication network or receive second key information from the AAA server in the radiocommunication network.

According to at least one example embodiment, a network includes an authentication, authorization and accounting (AAA) proxy configured to receive authentication information for user equipment from a wireless access point, to generate key information based on stored key information associated with the user equipment, and to transmit the key information to the wireless access point, the key information allowing the user equipment access to a network via the wireless access point, the AAA proxy being a proxy for an authentication, authorization and accounting (AAA) server in the radiocommunication network, wherein the AAA proxy does not transmit information to the AAA server in the radiocommunication network or receive second key information from the AAA server in the radiocommunication network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

Figure 1:
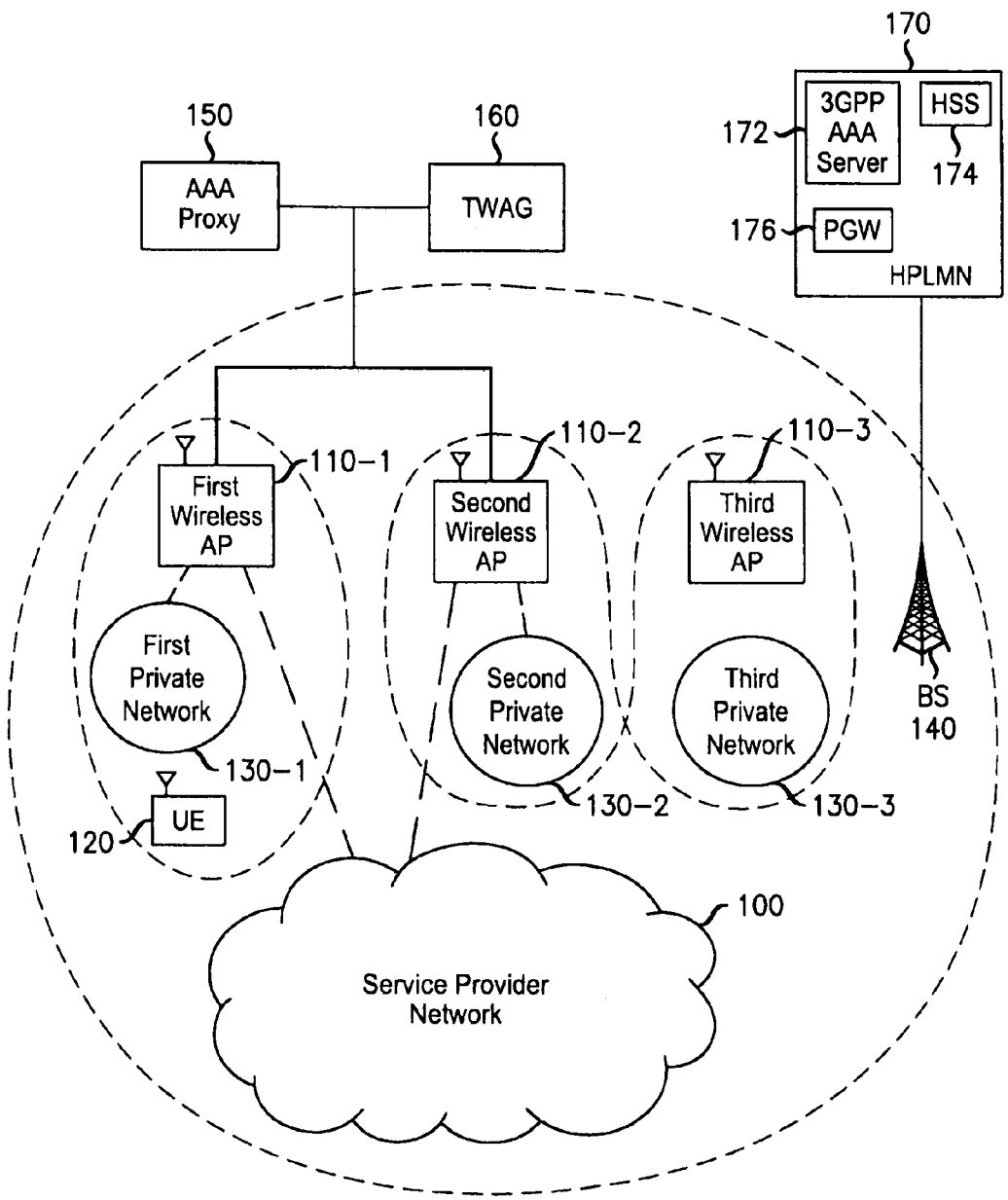
FIG. 1 illustrates a network diagram including several wireless access points having separate private networks and a shared Service Provider network, according to some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which some example embodiments are shown. Example embodiments may, however, be embodied in many different forms and should not be construed as being limited to the example embodiments set forth herein; rather, these example embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain some illustrative example embodiments. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, receiver, etc., and may describe a remote user of wireless resources in a wireless communication network. The term "base station" (BS) may be considered synonymous to and/or referred to as a base transceiver station (BTS), Node B, etc. and may describe equipment that provides data and/or voice connectivity between a network and one or more users. The term "wireless access point" may be considered synonymous to and/or referred to as a wireless router, a public gateway, a public/private gateway etc. and may describe equipment that provides data and/or voice connectivity between a network and one or more users. The wireless access point may be collocated with a "Residential Gateway (RGW)." The term "Trusted Wireless Access Gateway (TWAG)" may be considered synonymous to and/or referred to as a "wireless access gateway," an "IP service Edge router," an "IP Edge router," an "edge router," etc., and correspond to a 3GPP function defined in 3GPP 23.402 §16. The term "authentication, authorization and accounting (AAA) proxy" may be considered synonymous to and/or referred to as a "AAA proxy of the Wireless Local Area Network (WLAN) provider," "Trusted WLAN AAA Proxy (TWAP)," etc., and may correspond to a 3GPP function defined in 3GPP 23.402 §16. The AAA proxy may be collocated with the TWAG.

Typically, user equipment connects to a Service Provider network via base stations and user equipment connects to individual private networks through each individual wireless access point. As will be understood, it is conventional to connect to an individual wireless access point using preshared information or the like, which grants the user equipment access to a private network associated with each individual wireless access point. User equipment may connect to the internet via these individual wireless access points in conjunction with the base stations when the wireless access points are available, but the wireless access points do not provide the comprehensive coverage that the base stations provide.

Example embodiments are directed towards providing connectivity between user equipment and the Service Provider network via wireless access points when the user equipment doesn't have private access to the wireless access points. For example, user equipment may connect to the Service Provider network via a wireless access point even if the user equipment may not connect to the private network associated with the wireless access point.

FIG. 1 illustrates a network diagram including several wireless access points 110 having separate private networks 130 and a shared Service Provider network 100, according to some example embodiments. For example, the network includes a first wireless access point 110-1, a second wireless access point 110-2 and a third wireless access point 110-3. The wireless access points 110 are part of a Wireless Local Area Network (WLAN) and a base station (BS) 140 is part of a radiocommunication network. The WLAN and the radiocommunication network will be described using 3GPP protocol. The WLAN may be a local area network that uses high frequency radio signals to transmit and receive data over distances of a few hundred feet, according to some example embodiments.

The WLAN may include a Trusted Wireless Access Network (TWAN) provider that includes an authentication, authorization and accounting (AAA) proxy 150, a Trusted Wireless Access Gateway (TWAG) 160 and several wireless access points 110. The TWAG 160 may be referred to as an IP Edge and the wireless access points 110 may include residential gateways. The AAA proxy 150 may be collocated with the TWAG 160, but this may vary. The AAA proxy 150 belongs to a mobility domain or extended service set (ESS). There is a trust relationship between all these elements within the WLAN, allowing them to share authentication and security related data.

The TWAG 160 may act as the first hop router for the user equipment 120. The TWAG 160 may allow the user equipment 120 to reach the services of a PLMN (Public Land Mobile Network as defined in 3GPP) and especially to reach a Packet Data Network Gateway (PGW), which is the mobile anchor point between IP connectivity over the radiocommunication network and IP connectivity over WLAN. Therefore, the TWAG 160 may support IP address preservation and mobility between the radiocommunication network and WLAN coverage.

The radiocommunication network may include a Home Public Land Mobile Network (HPLMN) 170 and may include a 3GPP authentication, authorization and accounting (AAA) server 172, a Home Subscriber Server (HSS) 174 and a Packet Data Network Gateway (PGW) 176 along with at least one BS 140.

The BS 140 may provide a large coverage area with access to a Service Provider network 100. For example, the BS 140 may provide user equipment (UE) 120 with access to the Service Provider network 100. A first wireless access point 110-1 may provide the user equipment 120 with access to a first private network 130-1 or the Service Provider network 100. A second wireless access point 110-2 may provide the user equipment 120 with access to a second private network 130-2 or the Service Provider network 100.

A third wireless access point 110-3 may provide the user equipment 120 with access to a third private network 130-3 but not provide access to the Service Provider network 100. This may be due to the third wireless access point 110-3 being associated with a different service provider than the first wireless access point 110-1 and the second wireless access point 110-2. For example, only wireless access points 110 associated with a first service provider may allow access to a first service provider network, whereas wireless access points associated with a second service provider may allow access to a second service provider network. However, example embodiments are not limited thereto and the third wireless access point 110-3 is merely an example of any wireless access point 110 that does not allow access to the Service Provider network 100.

In addition, the first wireless access point 110-1 and the second wireless access point 110-2 are associated with a different private network while also providing access to the same Service Provider network 100. Example embodiments are not limited thereto, however, and several wireless access points 110 may provide access to the same private network 130. For example, the first wireless access point 110-1 and the second wireless access point 110-2 may both provide access to the first private network 130-1. In addition, some wireless access points may not provide access to the Service Provider network 100, as shown with the third wireless access point 110-3.

Each private network may include other network devices, such as a network printer, server, etc. For each private network 130, the wireless access point 110 may control local routing, such as to a printer or other local network device, and/or network address translation (NAT) to a unique IP address allocated by the TWAG 160.

The Service Provider network 100 may include other network devices not shown in FIG. 1. For example, the Service Provider network 100 may include a network printer or a network server. For the Service Provider network 100, the wireless access point 110 may enforce authentication per Hot Spot 2.0 and/or forced-forwarding to the TWAG 160, especially when IP address preservation between the radiocommunication network and the WLAN is supported, but the wireless access point 110 does not support network address translation (NAT).

For the sake of simplicity, connecting to a private network 130 or the Service Provider network 100 via a wireless access point 110 implies that the user equipment 120 also connects to the internet via the wireless access point 110. For example, while the user equipment 120 connects to the internet via the wireless access point 110 and not via the private network 130, connecting to the private network 130 implies that the user equipment 120 is capable of connecting to the internet via the wireless access point 110 as well. Similarly, connecting to the Service Provider network 100 implies that the user equipment 120 is capable of connecting to the internet via the wireless access point 110. In addition, after authenticating that the user equipment 120 is permitted access to the private network 130, the wireless access point 110 may connect the user equipment 120 to the Service Provider network 100.

Connecting to the service provider network 100 may include accessing a portal site for the service provider. Alternatively, the service provider network 100 may connect the user equipment 120 to the internet directly. As another example, the Service Provider network 100 may be accessed different depending on if the user equipment 120 connects to the Service Provider network 100 directly or after being permitted access to the private network 130.

Figure 2:
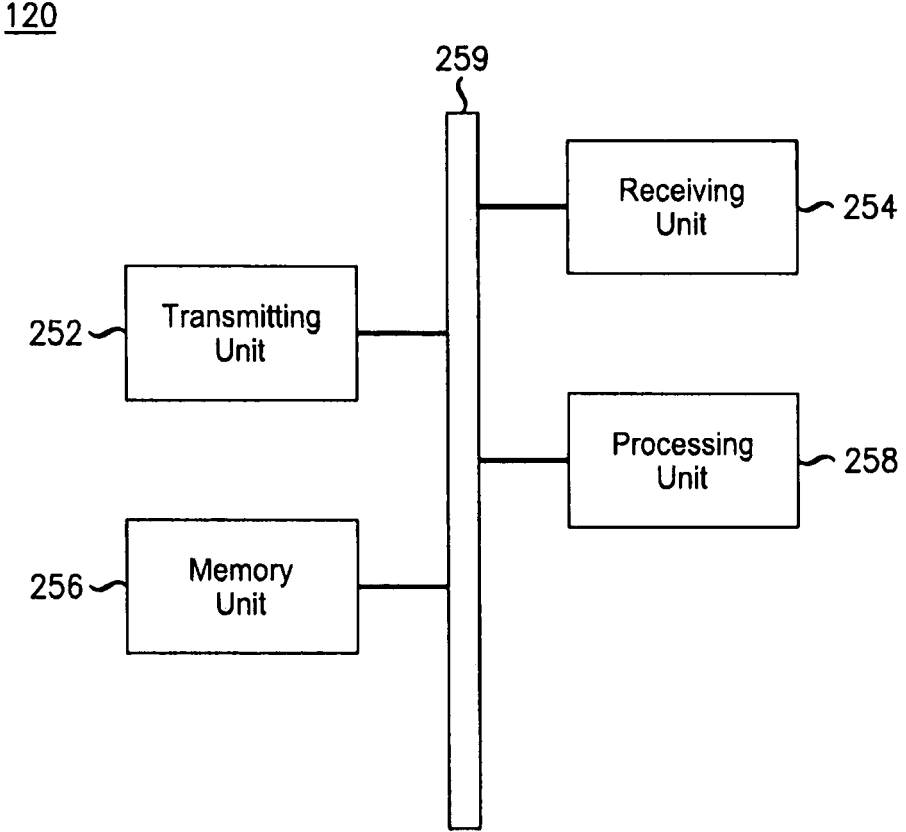
FIG. 2 illustrates an example structure of user equipment, according to some example embodiments.

FIG. 2 illustrates an example structure of user equipment 120, according to some example embodiments. Each user equipment may have the same general structure as illustrated in FIG. 2. In FIG. 2, the user equipment 120 may include, for example, a transmitting unit 252, a receiving unit 254, a memory unit 256 and a processing unit 258 that are connected by a data bus 259.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the network.

The receiving unit 254 is a device that includes hardware and any necessary software for receiving wireless signals including, for example, data signals, control signals, and signal strength/quality information via one or more wireless connections to other network elements in the network. The transmitting unit 252 may transmit signals to a wireless access point and/or a base station, while the receiving unit 254 may receive signals from the wireless access point and/or a base station.

The memory unit 256 may be any storage medium capable of storing, containing or carrying instruction(s) and/or data.

A storage medium can also be referred to as a "programmable storage medium," "recordable storage medium" and "computer-readable storage medium." The storage medium may be magnetic (e.g., a floppy disk or a hard drive) or optical (e.g., a compact disk read only memory, or "CD ROM"), and may be read only or random access. For example, as disclosed herein, the term "storage medium" may represent one or more devices for storing data, including read only memory (ROM), random access memory (RAM), magnetic RAM, core memory, magnetic disk storage mediums, portable or fixed storage devices, optical storage mediums, flash memory devices and/or other machine readable mediums for storing information. The invention is not limited by these aspects of any given implementation. The software implemented aspects of the invention are typically encoded on some form of storage medium.

The processing unit 258 may be any device capable of processing data including, for example, a microprocessor configured to carry out specific operations based on input data, or capable of executing instructions included in computer readable code. For example, the processing unit 258 may be configured to be programmed to operate as described in greater detail below with reference to FIG. 4, and the memory unit 256 may be configured to store the program. As can be appreciated, the processor is therefore a specific purpose machine.

Figure 3:
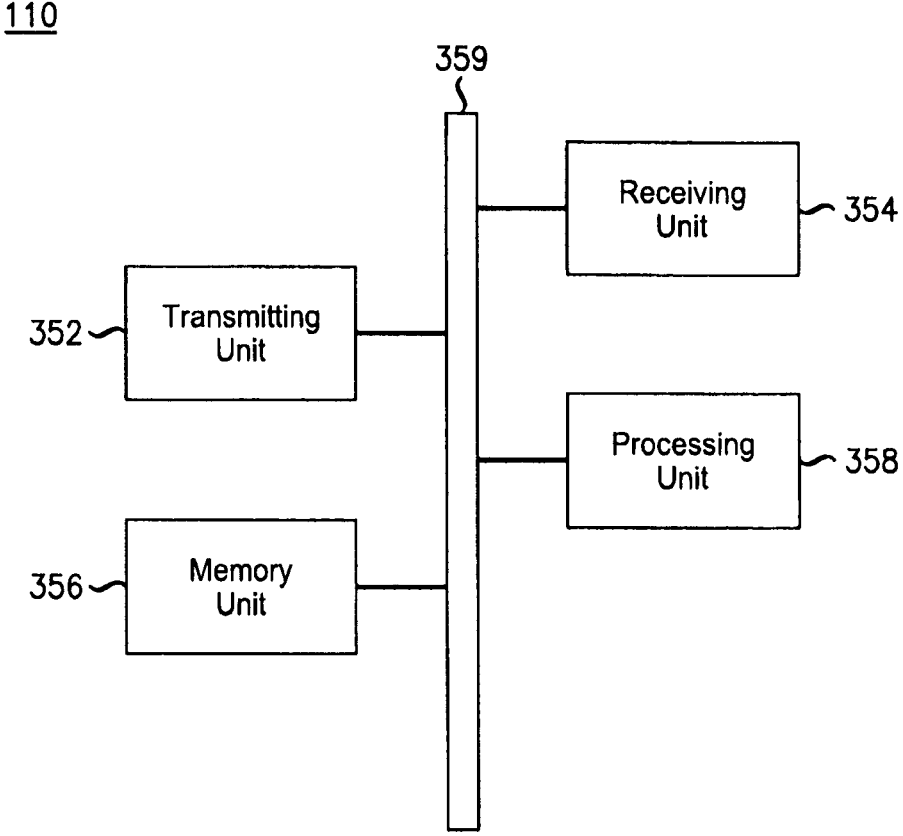
FIG. 3 illustrates an example structure of a wireless access point, according to some example embodiments.

FIG. 3 illustrates an example structure of a wireless access point 110, according to some example embodiments. Each wireless access point, for example the first wireless access point 110-1, the second wireless access point 110-2 and the third wireless access point 110-3, may have the same general structure as illustrated in FIG. 3. In FIG. 3, the wireless access point 110 may include, for example, a transmitting unit 352, a receiving unit 354, a memory unit 356 and a processing unit 358 that are connected by a data bus 359.

The transmitting unit 352, receiving unit 354, memory unit 356, and processing unit 358 may send data to and/or receive data from one another using the data bus 359. The transmitting unit 352 is a device that includes hardware and any necessary software for transmitting wireless signals including, for example, data signals, control signals, and signal strength/quality information via one or more wireless connections to other network elements in the network.

The receiving unit 354 is a device that includes hardware and any necessary software for receiving wireless signals including, for example, data signals, control signals, and signal strength/quality information via one or more wireless connections to other network elements in the network. The transmitting unit 352 may transmit signals to the user equipment, while the receiving unit 354 may receive signals from the user equipment.

The memory unit 356 may be any storage medium capable of storing, containing or carrying instruction(s) and/or data.

The processing unit 358 may be any device capable of processing data including, for example, a microprocessor configured to carry out specific operations based on input data, or capable of executing instructions included in computer readable code. For example, the processing unit 258 may be configured to be programmed to operate as described in greater detail below with reference to FIG. 5, and the memory unit 356 may be configured to store the program. As can be appreciated, the processor is therefore a specific purpose machine.

An explanation of how user equipment 120 connects to a private network 130 or the Service Provider network 100 will now be given.

It is conventional for a wireless access point 110 to allow the user equipment 120 access to a private network 130 using a pre-shared key configured in both the user equipment 120 and the wireless access point 110. For example, to access the private network 130, the user equipment 120 needs security information matching the security information of the private network 130. If the user equipment 120 is permitted access to the private network 130, the user equipment 120 is allowed access to the other network devices within the private network 130. As discussed above, being permitted access to the private network 130 also implies the user equipment 120 may connect to the internet via the wireless access point 110. If the user equipment 120 is not permitted access to the private network 130, the user equipment 120 is not allowed access to the other network devices within the private network 130 and likewise may not connect to the internet via the wireless access point 110.

According to some example embodiments, the user equipment 120 may connect to the Service Provider network 100 via wireless access points 110 to offload data from the radio-communication network. To access the Service Provider network 100, the user equipment 120 may need authentication information including security information matching the security information associated with the Service Provider network 100. If the authentication information associated with the user equipment 120 or the security information stored in the user equipment 120 matches the authentication information or security information associated with the Service Provider network 100, the user equipment 120 may connect to the Service Provider network 100 via any wireless access point 110 with access to the Service Provider network 100. For example, the user equipment 120 may connect to the Service Provider network 100 through the first wireless access point 110-1, shown in FIG. 1. As the user equipment travels outside of a coverage area of the first wireless access point 110-1, the user equipment may connect to the Service Provider network 100 through the second wireless access point 110-2, shown in FIG. 1, using the same authentication information or security information. While the user equipment may be connected to the Service Provider network 100 through the first wireless access point 110-1, the user equipment is not permitted access to the first private network 130-1 unless security information in the user equipment matches the security information for the first private network 130-1. As discussed above, being permitted access to the Service Provider network 100 implies that the user equipment 120 may connect to the internet via the wireless access point 110-1, despite not being permitted access to the first private network 130-1.

When the user equipment 120 initially connects to the Service Provider network 100 of a wireless access point 110, the user equipment 120 is authenticated. The authentication process requires extensive signaling as messages are exchanged between the user equipment 120, the wireless access point 110, AAA proxy 150 and/or the 3GPP AAA server 172. According to some example embodiments, this authentication process can become more efficient if the AAA proxy 150 stores information related to the user equipment 120. If the user equipment 120 roams amongst additional wireless access points 110 connected to the AAA proxy 150 or in the same extended service set (ESS), the AAA proxy 150 uses this information to reduce the amount of signaling required in a re-authentication process.

According to IEEE 802.11r, fast re-authentication is implemented by caching in a Wireless Local Area Network Access Concentrator (WLAN AC) a key derived from the Master Session Key (MSK) received from the 3GPP AAA server 172. For example, the key may be a Pairwise Master Key (PMK-R0/PMK-R1), which is a shared secret key determined by an EAP exchange or WPA2-PSK. The user equipment 120 may validate its identity using the key derived from the MSK without needing the lengthy authentication process involving the 3GPP AAA server 172. However, this technique requires a WLAN AC, which are typically implemented in a corporate environment where mobility between different wireless access points is very frequent, and where continuous and overlapping coverage by wireless access points 110 exists.

In some example embodiments, fast re-authentication can be implemented without requiring a WLAN AC. This allows fast re-authentication to be implemented in a residential environment where wireless access points 110 do not have continuous and overlapping coverage. In addition, this does not require the additional expense of a WLAN AC.

According to some example embodiments, the AAA proxy 150 may store information related to the user equipment 120, such as a first key (for example, the MSK). Instead of relaying the MSK to a first wireless access point 110-1 to which the user equipment 120 is connected, the AAA proxy 150 stores the MSK and generates a second key (for example, the PMK-R0) based on the first key and a third key (for example, the PMK-R1) based on the second key. The AAA proxy 150 then transmits the third key to the first wireless access point 110-1. If the user equipment 120 disconnects from the first wireless access point 110-1 and connects to a second wireless access point 110-2 connected to the AAA proxy 150 or in the same ESS, the AAA proxy 150 is able to reduce the amount of signaling involved and transmit the third key to the second wireless access point 110-2 without requiring a second authentication process with the 3GPP AAA server 172. In addition, the TWAG 160 may store IP connectivity data when the user equipment 120 disconnects from the first wireless access point 110-1 and may transmit the IP connectivity data to the second wireless access point 110-2. Therefore, the user equipment 120 may benefit from 802.11r fast basic service set (BSS) transition and IP address preservation without requiring a WLAN AC and without contacting the 3GPP AAA server 172.

If the user equipment 120 roams amongst additional wireless access points connected to the AAA proxy 150, the AAA proxy 150 may use this information to reduce the amount of signaling required in a re-authentication process.

In some example embodiments, the user equipment 110 is authenticated via its UMTS (Universal Mobile Telecommunications System) Subscriber Identity Module (USIM) using a first wireless access point 110-1. The user equipment 110 sends a network access identifier (NAI) under the form of IMSI@PLMN (or IMSI!HPLMN@VPLMN) and thus the AAA proxy 150 can contact the 3GPP AAA server 172 of the relevant HPLMN 170. Based on Authorization data received from the 3GPP AAA server 172, the TWAG 160 may provide differentiated services, such as different traffic routing (including the connection to a PGW 176) and different quality of service (QoS).

Figure 4:
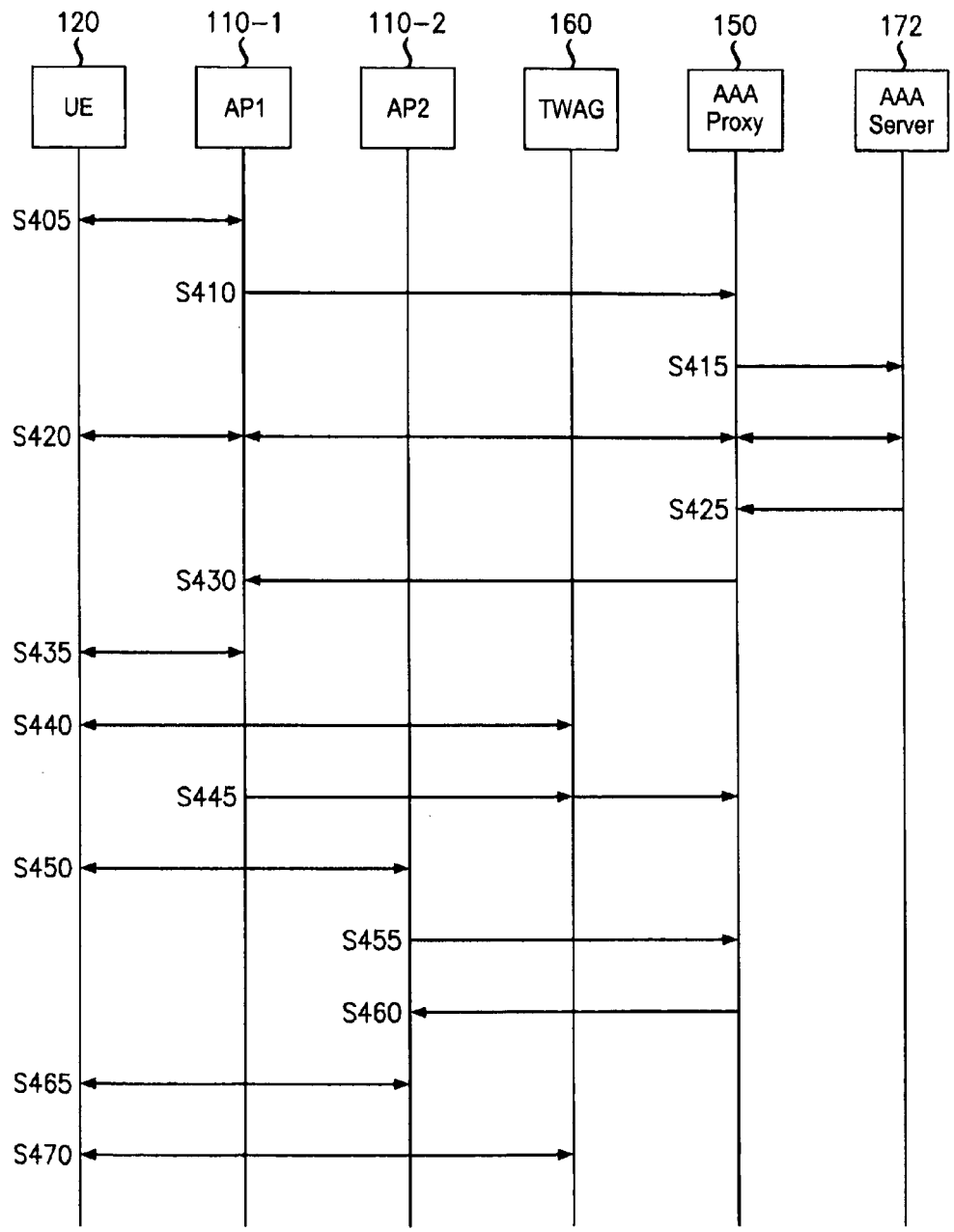
FIG. 4 illustrates a simplified communication diagram of the user equipment connecting to the Service Provider network through a first wireless access point and a second wireless access point, according to some example embodiments.

FIG. 4 illustrates a simplified communication diagram of the user equipment 120 connecting to the Service Provider network 100 through a first wireless access point 110-1 and subsequently a second wireless access point 110-2, according to some example embodiments. The user equipment 120 and all elements in the WLAN and radiocommunication network may communicate using any methods known in the art. The drawings are intended to illustrate the unique methods of example embodiments and may not include details regarding current methods or protocols known in the art. Therefore, the simplified communication diagram may omit details known in the art or may condense multiple signals into a single step.

At S405, the user equipment 120 communicates with a first wireless access point 110-1. The user equipment 120 may communicate with the first wireless access point 110-1 using any method known in the art. For example, the user equipment 120 may send a probe request and the first wireless access point 110-1 may send a probe response prior to the user equipment 120 sending authentication information. Authentication information may include security information, but in some example embodiments security information is not required.

The process of sending authentication information to the first wireless access point 110-1 may be more detailed than described above. For example, the user equipment 120 may iteratively send authentication information including unique security information from a first list of security information to the first wireless access point 110-1 for a first private network 130-1 until the user equipment receives authorization or exhausts the first list of security information. Similarly, the user equipment 120 may iteratively send authentication information including unique security information from a second list of security information to first wireless access point 110-1 for the Service Provider network 100 until the user equipment 120 receives authorization or exhausts the second list of security information. The second list of security information may be identical to the first list of security information, but the second list may instead be unique. Finally, the user equipment 120 may send authentication information and then be authenticated by the 3GPP AAA Server 172.

The security information may include a general password or may include a username and password. For example, the security information may include a pre-shared key (PSK) that is shared by every device connected to the first wireless access point 110-1 or network. Alternatively, the security information may include a unique username and password that is specific to a particular user.

The security information and the type of security information may be the same or different between the Service Provider network 100 and the first private network 130-1. For example, the first private network 130-1 may require a pre-shared key, whereas the Service Provider network 100 may require a username and password.

The authentication information may include information used to determine a Pairwise Master Key (PMK-R0/PMK-R1), which is a shared secret key determined by an EAP exchange or WPA2-PSK. For example, the authentication information may include a unique identifier stored within the user equipment 120 in a subscriber identification module (SIM), a Media Access Control (MAC) address of the user equipment 120, the service set identification (SSID), which is the ID of the Service Provider network 100, the basic service set identification (BSSID), which is a MAC address of the first wireless access point 110-1, and the Mobility Domain Identifier (MDID).

Typically, S405 includes several messages between the user equipment 120 and the first wireless access point 110-1. For example, the first wireless access point 110-1 may include the BSSID, SSID and MDID in a Beacon and Probe Response, which the user equipment 120 receives. The user equipment 120 and the first wireless access point 110-1 may then send an Association Request/Response that may include information like a Mobile Domain Information Element (MDIE), which includes the MDID, a Fast BSS Transition information element (FTIE), which may include the R0KH-ID and R1KH-ID, and other information like the S0KH-ID/S1KH-ID and EAP messages that include the Network Access Identifier (NAI) of the user equipment 120. The S0KH-ID/S1KH-ID is the location of the PMK-S0/PMK-S1, respectively, which in this case is the "Supplicant's MAC address." For example, the MAC address of the user equipment 120 is known to the user equipment 120 and the first wireless access point 110-1 as the MAC address is the source address used in 802.11 frames. The R0KH-ID is an identifier that names the holder of the PMK-R0 in the Service Provider network 100, which in this case is the AAA proxy 150. The R1KH-ID is an identifier that names the holder of the PMK-R1 in the Service Provider network 100, which in this case is an Authenticator of the first wireless access point 110-1. The Authenticator may be deployed in the first wireless access point 110-1, in which case the R1KH-ID is the MAC address of the first wireless access point 110-1. Otherwise, the R1KH-ID is the MAC address of the Authenticator.

At S410, the first wireless access point 110-1 may send the authentication information to an authentication, authorization and accounting (AAA) proxy 150. This may start the authentication sequence and add the AAA proxy 150 to the AAA flow. For example, the first wireless access point 110-1 may send a Radius Access Request message containing the EAP message from the user equipment 120 (including the NAI), and any information needed to determine the PMK-R0/PMK-R1, such as the BSSID, the SSID, the MDID, the R1KH-ID and the S0KH-ID/S1KH-ID discussed above.

At S415, the AAA proxy 150 may determine if the authentication information provided by the user equipment 120 is valid. The AAA proxy 150 may determine if the authentication information is valid by checking a lookup table or the like located within the AAA proxy 150, or by contacting an authentication, authorization and accounting (AAA) server 172 located within a HPLMN 170, as described below with regard to FIG. 5.

In the prior art, the AAA proxy 150 typically sends at least a portion of the authentication information to the 3GPP AAA server 172 for every authentication process. As the user equipment 120 is not benefiting from fast re-authentication while connecting to the first wireless access point 110-1, the AAA proxy 150 may transmit at least a portion of the authentication information to the 3GPP AAA server 172 in S415. For example, during S415 the AAA proxy 150 may transmit a Radius Access Request message containing the EAP message from the user equipment 120, which includes the NAI, and the BSSID and SSID discussed above.

Step S420 may include communication between the 3GPP AAA server 172 and the user equipment 120, although this may vary. For example, S420 may include communication between the 3GPP AAA server 172 and the AAA proxy 150 or first wireless access point 110-1 without including the user equipment 120. During S420, the EAP-AKA' protocol may run back and forth between the user equipment 120 and the 3GPP AAA server 172. This corresponds to multiple messages relayed by the first wireless access point 110-1 and the AAA proxy 150. Step S420 requires extensive signaling and therefore avoiding S420 is beneficial.

Step S425 may include communication between the 3GPP AAA server 172 and the AAA proxy 150, during which the AAA proxy 150 may receive a first key from the 3GPP AAA server 172, such as the Master Session Key (MSK). For example, S425 may be the end of the EAP-AKA' protocol, and the 3GPP AAA server 172 may send an authentication and authorization accept that contains an EAP success message, Authorization Data and/or the MSK to the AAA proxy 150 and/or the TWAG 160. The TWAG 160 typically stores the Authorization Data for later use, the Authorization Data being network connectivity parameters used by the TWAG to determine whether it can accept connectivity requests from the user equipment 120. The EAP Success Message indicates that the 3GPP AAA server 172 has successfully authenticated the user equipment 120 and is a trigger for the user equipment 120 and the Service Provider network 100 to start the key derivation process.

Assuming the 3GPP AAA server does authenticate the user equipment 120, at S430, the AAA proxy 150 generates and stores a second key, for example PMK-R0, based on the first key. The AAA proxy 150 then generates a third key, for example PMK-R1, based on the second key.

As an example, the AAA proxy 150 may determine:
the PMK-R0 per the algorithm defined as part of 802.11r, i.e. using a Key Derivation Function that takes inputs (for an exhaustive list refer to IEEE 811.r) including the Master Session Key (MSK) (received from the 3GPP AAA proxy/server 172), the SSID (received from an Authenticator in the first wireless access point 110-1), the Identity of the AAA proxy 150 of the WLAN provider (determined locally and to be provided to the authenticator in the first wireless access point 110-1), the MAC address of the user equipment 120 and the Mobility Domain Identifier (received from the Authenticator in the first wireless access point 110-1). This PMK-R0 is determined once (when the user equipment 120 gets authenticated and an MSK is determined by the 3GPP AAA server 172) and stored in the AAA proxy 150 of the WLAN provider together with the user equipment 120 context and never communicated to the first wireless access point 110-1; or the PMK-R1 per the algorithm defined as part of 802.11r, i.e. using a Key Derivation Function that takes inputs including the PMK-R0 (as determined above), the BSSID (MAC address of the first wireless access point 110-1 received from the Authenticator in the first wireless access point 110-1), the MAC address of the user equipment 120 and the Mobility Domain Identifier (received from the Authenticator in the first wireless access point 110-1). This PMK-R1 is communicated to the first wireless access point 110-1 and used to establish the proper 802.1x security between the user equipment 120 and this first wireless access point 110-1.

At S430, the AAA proxy 150 transmits a Radius Access Request to the first wireless access point 110-1 including the third key (for example, the PMK-R1), the R0KH-ID and the EAP Success Message.

Otherwise, if the 3GPP AAA server 172 does not authenticate the user equipment 120, the AAA proxy 150 does not transmit the third key to the first wireless access point 110-1 and the user equipment 120 is not provided with access to the Service Provider network 100 or access to the internet via the first wireless access point 110-1.

At S435, the first wireless access point 110-1 communicates with the user equipment 120. For example, the first wireless access point 110-1 and the user equipment 120 may continue the security set-up procedure, such as negotiating a Pairwise Transient Key (PTK) used over the air link. During S435 and prior to negotiating the PTK, the user equipment 120 may generate the first key, the second key and the third key based on information known to the user equipment 120 or received from the first wireless access point 110-1. For example, the user equipment 120 may derive the MSK based on commonly known input parameters and a standard key derivation function (KDF). In addition, the user equipment 120 may generate the PMK-R0 and PMK-R1 using the same methodology described above with regard to the AAA Proxy 150. Note that none of the keying materials (MSK, PMK-R0 and PMK-R1) are ever sent over the air. Instead, the user equipment 120 determines these keying materials locally based on commonly known input parameters and on standard key derivation functions.

As an example, the key derivation functions are listed below:
R0-Key-Data=KDF-384(MSK, "FT-R0", SSIDlength∥SSID∥MDID∥R0KHlength∥R0KH-ID∥S0KH-ID)
PMK-R0=L(R0-Key-Data, 0, 256)
PMK-R1=KDF-256(PMK-R0, "FT-R1", R1KH-ID∥S1KH-ID)
PTK=KDF-PTKLen(PMK-R1, "FT-PTK", SNonce∥ANonce∥BSSID∥STA-ADDR)

During S435, the first wireless access point 110-1 may send the EAP Success Message, the R0KH-ID, the R1KH-ID and an Anonce value. The user equipment 120 may send a Snonce value. The Anonce/Snonce values are random values known to both the user equipment 120 and the first wireless access point 110-1.

After negotiating the PTK in S435, the user equipment 120 is connected to the first wireless access point 110-1 and may access the Service Provider network 100 through the first wireless access point 110-1.

At S440, the user equipment 120 communicates with the trusted wireless access gateway (TWAG) 160. For example, the user equipment may send Dynamic Host Configuration Protocol (DHCP) requests or any relevant signalling. If the TWAG 160 has stored IP connectivity for the user equipment 120 from a previous session, the TWAG 160 may transmit the IP connectivity to the user equipment 120. If the TWAG 160 has not stored the IP connectivity, the TWAG 160 may not transmit anything to the user equipment 120. As the user equipment 120 is not benefiting from fast re-authentication in Steps S405-440, the TWAG 160 has not stored IP connectivity for the user equipment 120.

At S445, it is assumed for purposes of description that the user equipment 120 has moved out of the coverage area of the first wireless access point 110-1 and the user equipment 120 is no longer connected to the first wireless access point 110-1. Accordingly, the first wireless access point 110-1 notifies the TWAG 160 and the AAA Proxy 150.

At S450, it is assumed for purposes of description that the user equipment 120 has moved into the coverage area of the second wireless access point 110-2 and attempts to connect to a second wireless access point 110-2. For example, the user equipment 120 may send an authentication request and a reassociation request in S450. To benefit from the fast BSS transition described in IEEE 802.11r, the second wireless access point 110-2 indicates support of the feature and the user equipment 120 may detect that the second wireless access point 110-2 is connected to the same AAA proxy 150 as the first wireless access point 110-1. For example, the second wireless access point 110-2 may broadcast a Mobility Domain Identifier (MDID) indicating that the second wireless access point 110-2 is included in the group of wireless access points 110 that are in the mobility domain. The user equipment 120 and the WLAN may exchange relevant FTIE ("Fast BSS transition information element") in Re-association Request/response 802.11 MAC frames.

The authentication information may include information used to determine a Pairwise Master Key (PMK-R0/PMK-R1), as described above. However, no EAP signaling messages or information are transmitted in Steps S450-470, as the user equipment 120 does not need to be authenticated by the 3GPP AAA server 172. For example, the user equipment 120 does not send the NAI to the second wireless access point 110-2 in S450, whereas the user equipment 120 sent the NAI to the first wireless access point 110-1 in S405.

Typically, S450 includes several messages between the user equipment 120 and the second wireless access point 110-2, similar to discussed above with regard to S405. For example, the first wireless access point 110-1 may include the BSSID, SSID and MDID in a Beacon and Probe Response, which the user equipment 120 receives. The user equipment 120 and the first wireless access point 110-1 may then send an Association Request/Response, Authentication request or re-association request that may include information like the MDIE, which includes the MDID, the Fast BSS Transition information element (FTIE), which may include the R0KH-ID and R1KH-ID, and other information like the S0KH-ID/S1KHID. The S0KH-ID/S1KH-ID is the location of the PMK-S0/PMK-S1, respectively, which is the MAC address of the user equipment 120 and the same as discussed above. The R0KH-ID is also the same as discussed above. However, the R1KH-ID is an identifier that names the holder of the PMK-R1 in the Service Provider network 100, which will now become an Authenticator of the second wireless access point 110-2. If the Authenticator is deployed in the second wireless access point 110-2, the R1KH-ID is the MAC address of the second wireless access point 110-2. Otherwise, the R1KH-ID is the MAC address of the Authenticator itself.

At S455, the second wireless access point 110-2 may send a Radius Access Request including the authentication information to the AAA proxy 150. This may include the same authentication information as discussed above with regard to S410, except no EAP signaling messages or information is transmitted in S455. For example, the second wireless access point 110-2 may send any information needed to determine the PMK-R0/PMK-R1, such as the BSSID, the SSID, the MDID, the R0KH-ID, the R1KH-ID and/or the S0KH-ID/S1KH-ID discussed above.

At S460, the AAA proxy 150 may determine if the authentication information provided by the user equipment 120 is valid. The AAA proxy 150 may determine if the authentication information is valid by checking a lookup table or the like located within the AAA proxy 150, as described below with regard to FIG. 5. Assuming the AAA proxy 150 does authenticate the user equipment 120, during step S455 the AAA proxy 150 may generate the second key, for example the PMK-R0, and/or the third key, for example the PMK-R1. At S460, the AAA proxy 150 may transmit a Radius Access Request to the second wireless access point 110-2 including the third key (for example, the PMK-R1) and the R0KH-ID. Note that the AAA proxy 150 does not transmit the EAP Success Message like it did in S430.

Otherwise, if the AAA proxy 150 does not authenticate the user equipment 120, the AAA proxy 150 does not transmit the third key to the second wireless access point 110-2 and the user equipment 120 is not provided with access to the Service Provider network 100 or access to the internet via the second wireless access point 110-2.

At S465, the second wireless access point 110-2 communicates with the user equipment 120. For example, the second wireless access point 110-1 and the user equipment 120 may continue the security set-up procedure, such as negotiating the PTK, as discussed above with regard to S435. For example, the second wireless access point 110-2 may send the R0KH-ID, the R1KH-ID and an Anonce value. The user equipment 120 may send a Snonce value. The Anonce/Snonce values are random values known to both the user equipment 120 and the second wireless access point 110-2.

During S465 and prior to negotiating the PTK, the user equipment 120 may generate the first key, the second key and the third key based on information known to the user equipment 120 or received from the second wireless access point 110-2. After negotiating the PTK, the user equipment 120 is connected to the second wireless access point 110-2 and may access the Service Provider network 100 and/or the internet through the second wireless access point 110-2.

At S470, the user equipment 120 communicates with the TWAG 160, as discussed above with regard to S440. For example, the user equipment may send Dynamic Host Configuration Protocol (DHCP) requests or any relevant signalling. If the TWAG 160 has stored IP connectivity for the user equipment 120 from the previous session, the TWAG 160 may transmit the IP connectivity to the user equipment 120. As the user equipment 120 is benefiting from fast re-authentication in Steps S450-470, the TWAG 160 has stored IP connectivity for the user equipment 120.

Figure 5:
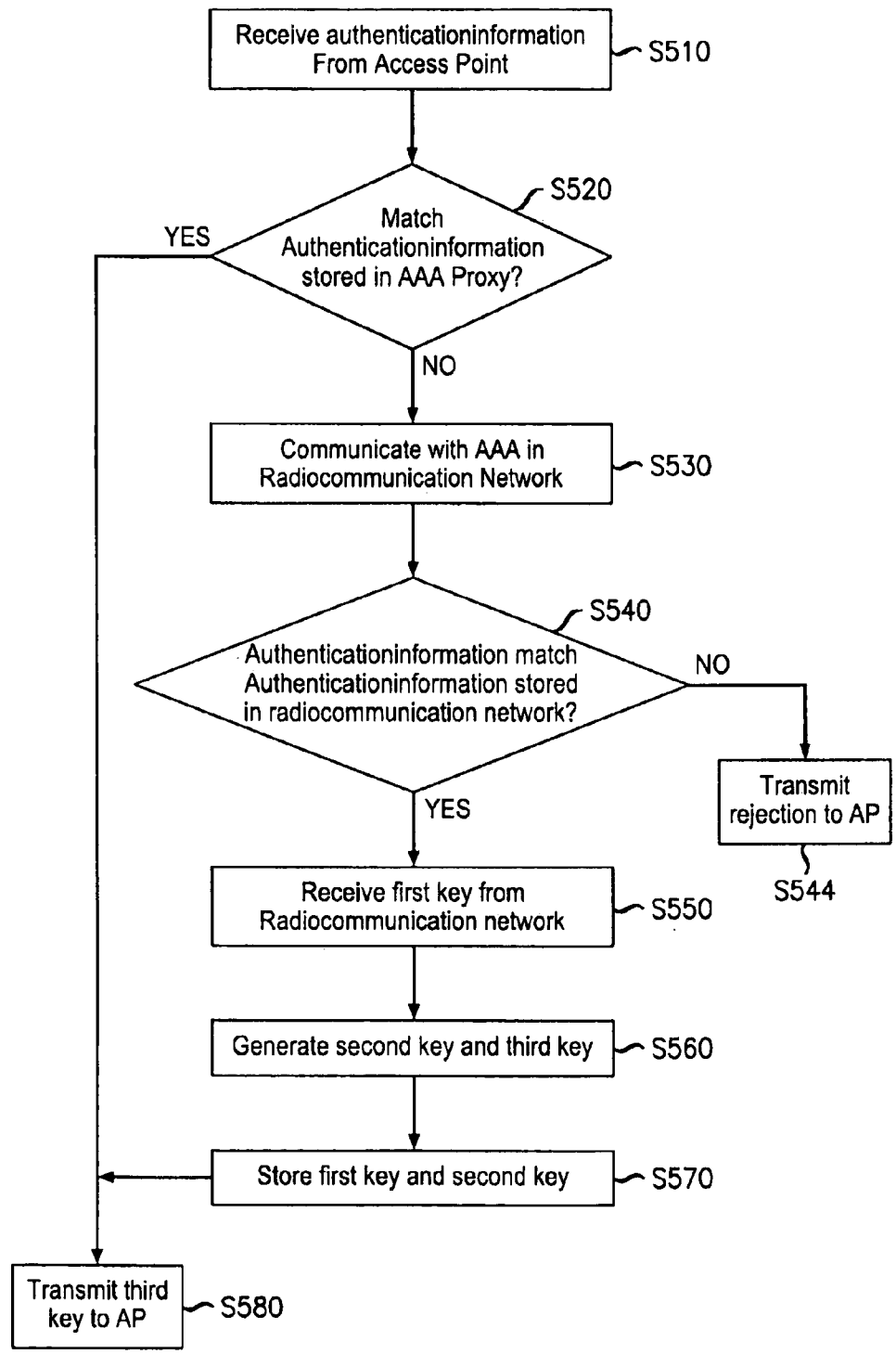
FIG. 5 is a flowchart illustrating a method for an authentication, authorization and accounting (AAA) proxy to authorize user equipment to access a Service Provider network via a wireless access point, according to some example embodiments.

FIG. 5 is a flowchart illustrating a method for a AAA proxy 150 to authorize user equipment 120 to access a Service Provider network 100 via a wireless access point 110, according to some example embodiments.

At S510, the AAA proxy 150 receives authentication information from the wireless access point 110. At S520, the AAA proxy 150 determines if the authentication information received from the wireless access point 110 matches authentication information stored in the AAA proxy 150. For example, the AAA proxy 150 may check whether the AAA proxy 150 has stored the MSK, PMK-R0 and/or PMK-R1 for the user equipment 120, whether the wireless access point 110 belongs to the same Mobility Domain (MDID) as a previous wireless access point 110 to which the user equipment 120 connected, and/or computes the PMK-R0 and/or PMK-R1.

If the authentication information matches, the method proceeds to S580, as discussed below. As will be appreciated, if the authentication information matches during S520, the AAA proxy does not transmit information to the AAA server in the radiocommunication network or receive key information from the AAA server in the radiocommunication network. However, if the authentication information does not match any authentication information stored in the AAA proxy 150, the method proceeds to S530.

At S530, the AAA proxy 150 communicates with the 3GPP AAA server 172 in the radiocommunication network. At S540, the AAA proxy 150 determines if the authentication information stored in the user equipment 120 matches authentication information stored in the 3GPP AAA server 172 in the radiocommunication network. The process of sending authentication information to the 3GPP AAA server 172 may be more detailed than described above. For example, the process may include signaling between the user equipment 120, the wireless access point 110, the AAA proxy 150 and/or the 3GPP AAA server 172. The authentication process may be an Extensible Authentication Protocol Method Authentication and Key Agreement (EAP-AKA'). In addition, the process of sending authentication information to the 3GPP AAA server 172 may include a 3GPP AAA proxy in a Visited Public Land Mobile Network (VPLMN), which is different than the 3GPP AAA proxy 172 in the Home PLMN (HPLMN) 170.

If the authentication information does not match, the method proceeds to S544 and the 3GPP AAA server 172 informs the AAA proxy 150, which sends a rejection to the wireless access point 110 rejecting access to the Service Provider network 100 by the user equipment 120.

If the authentication information matches, the method proceeds to S550. At S550, the AAA proxy 150 receives a first key from the 3GPP AAA server 172. For example, the first key may be the Master Session Key (MSK) generated by the user equipment 120 and the 3GPP AAA server 172. However, instead of transmitting the first key to the user equipment 120 or the first wireless access point 110-1, the method proceeds to S560. At S560, the AAA proxy 150 generates a second key based on the first key and generates a third key based on the second key. As an example, the AAA proxy 150 may generate the PMK-R0 from the MSK and generate the PMK-R1 from the PMK-R0.

At S570, the AAA proxy 150 may store the MSK and the PMK-R0 in the AAA proxy 150.

At S580, the AAA proxy 150 may transmit the third key, for example the PMK-R1, to the wireless access point 110.

Figure 6:
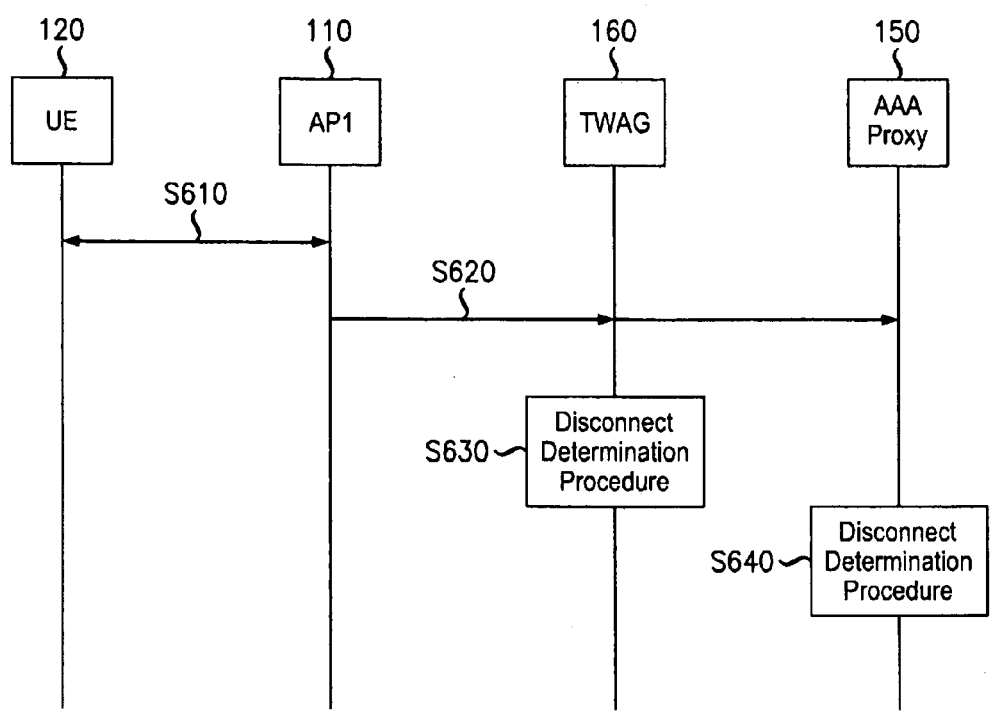
FIG. 6 illustrates a communication diagram when the user equipment disconnects from the first wireless access point, according to some example embodiments.

FIG. 6 illustrates a communication diagram for when the user equipment 120 disconnects from the first wireless access point 110-1, according to some example embodiments. At S610, the user equipment 120 is connected to the first wireless access point 110-1 until the user equipment 120 ceases signaling or travels out of range. As soon as the first wireless access point 110-1 detects that the user equipment 120 is no longer connected, the first wireless access point 110-1 notifies the AAA proxy 150 and the TWAG 160 at S620.

At S630, the TWAG 160 may begin a process discussed below with regard to FIG. 8. Similarly, at S640, the AAA proxy may begin a process discussed below with regard to FIG. 7. For example, upon receiving notice of the user equipment 120 disconnecting from the first wireless access point 110-1, at least one of the AAA proxy 150 and the TWAG 160 may initiate and start a timer. If the user equipment 120 does not reconnect to a wireless access point 110 connected to the AAA proxy 150 or the TWAG 160 prior to the timer expiring, the AAA proxy 150 and/or the TWAG 160 may delete any information stored therein related to the user equipment 120. As a result, the user equipment will not be able to benefit from fast re-authentication after the timer has expired.

Figure 7:
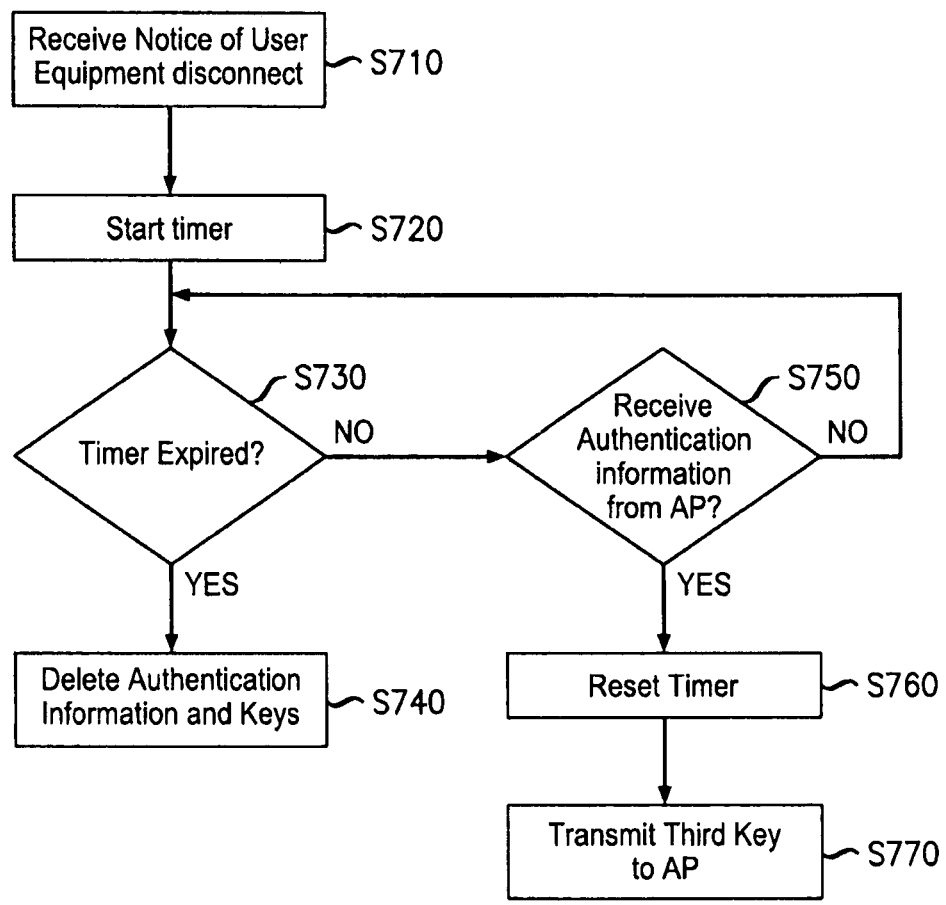
FIG. 7 is a flowchart illustrating a method for a AAA proxy to determine if the user equipment reconnects prior to a timer expiring after the user equipment disconnects from the first wireless access point, according to some example embodiments.

FIG. 7 is a flowchart illustrating a method for a AAA proxy 150 to determine if the user equipment 120 reconnects prior to a timer expiring after the user equipment 120 disconnects from the first wireless access point 110-1, according to some example embodiments. At S710, the AAA proxy 150 receives notice of the user equipment 120 disconnecting from the first wireless access point 110-1. The AAA proxy 150 keeps the authentication information, such as the first key (for example, the MSK), the second key (for example, the PMK-R0) and the authorization data associated with the user equipment 120. At S720, the AAA proxy 150 may initiate and start a timer. Alternatively, the AAA proxy 150 may utilize an external timer.

At S730, the AAA proxy 150 detects if the timer has expired. If the timer has expired, the method proceeds to S740 and the first key, second key and other authentication information associated with the user equipment 120 is deleted from the AAA proxy 150 and the AAA proxy 150 notifies the 3GPP AAA server 172.

If the timer has not yet expired, the method proceeds to S750, where the AAA proxy 150 determines if the AAA proxy 150 has received authentication information for the user equipment 120 from any wireless access point 110 connected to the AAA proxy 150. For example, the user equipment 120 may connect to the first wireless access point 110-1 or to a second wireless access point 110-2, if both the first wireless access point 110-1 and the second wireless access point 110-2 are connected to the AAA proxy 150. If the AAA proxy 150 receives the authentication information, the method proceeds to S760 and the timer is stopped. The method then proceeds to S770 and the AAA proxy 150 transmits a third key (for example, a PMK-R1) to the wireless access point that transmitted the authentication information. If the AAA proxy 150 does not receive the authentication information, the method proceeds to S730 and repeats until the timer expires.

Figure 8:
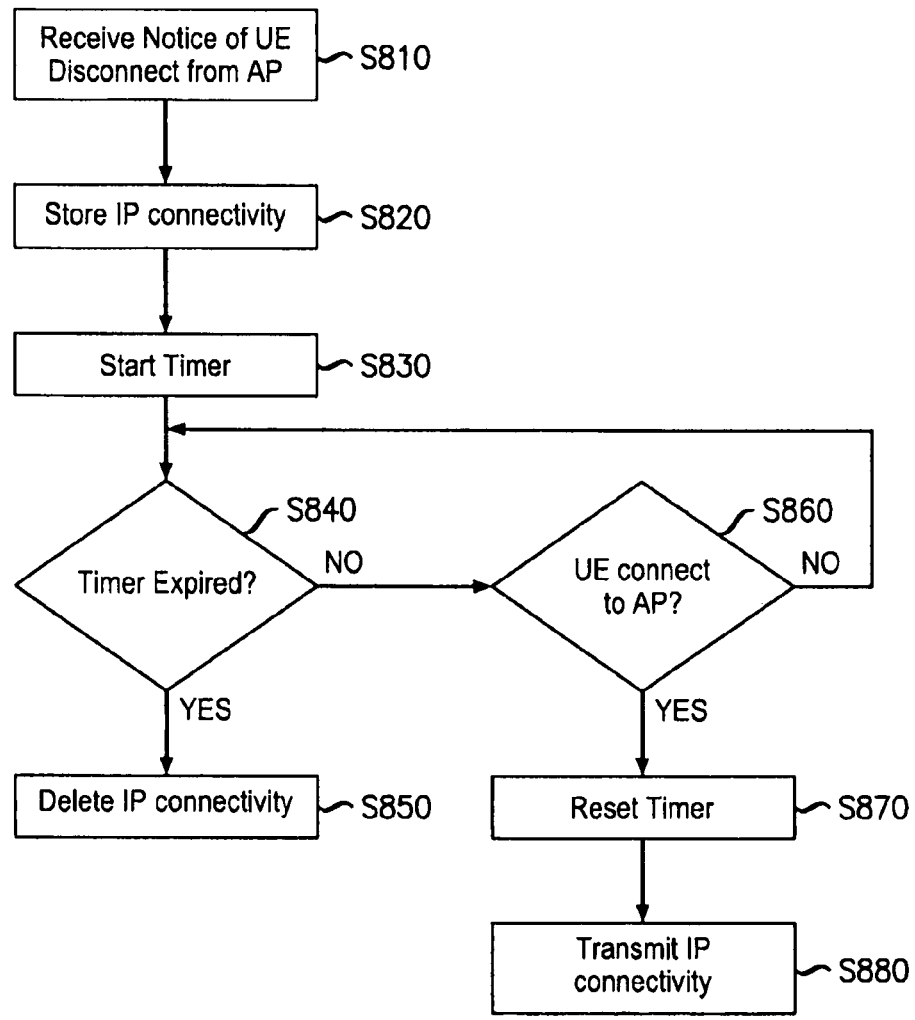
FIG. 8 is a flowchart illustrating a method for the Trusted Wireless Access Gateway (TWAG) to determine if the user equipment reconnects prior to a timer expiring after the user equipment disconnects from the first wireless access point, according to some example embodiments.

FIG. 8 is a flowchart illustrating a method for the TWAG 160 to determine if the user equipment 120 reconnects prior to a timer expiring after the user equipment 120 disconnects from a first wireless access point 110-1, according to some example embodiments. At S810, the TWAG 160 may receive notice of the user equipment 120 disconnecting from the first wireless access point 110-1. At S820, the TWAG 160 may store IP connectivity data and any other information associated with the user equipment 120, such as any S2a connection established with PGW 176.

At S830, the TWAG 160 may initiate and start a timer. Alternatively, the TWAG 160 may utilize an external timer, such as a timer internal to the AAA proxy 150.

At S840, the TWAG 160 detects if the timer has expired. If the timer has expired, the method proceeds to S850 and the IP connectivity data and any other information associated with the user equipment 120 is deleted from the TWAG 160.

If the timer has not yet expired, the method proceeds to S860, where the TWAG 160 determines if the user equipment 120 has connected to any wireless access point 110 connected to the TWAG 160. For example, the user equipment 120 may connect to the first wireless access point 110-1 or to a second wireless access point 110-2, if both the first wireless access point 110-1 and the second wireless access point 110-2 are connected to the TWAG 160. If the user equipment 120 has connected to a wireless access point 110 connected to the TWAG 160, the method proceeds to S870 and the timer is stopped. The method then proceeds to S880 and the TWAG 160 transmits the IP connectivity data to the wireless access point 110 connected to the user equipment 120.

As the S2a connections established with the PGW 176 for the user equipment 120 are stored in the TWAG 160, the IPv4 address allocation is kept for the user equipment 120. The TWAG 160 does not need to re-establish the S2a links and thus provides the user equipment 120 with the same IP address and/or Prefix as stored previously. However, because the IPv4 addresses are scarce, the time during which the IP address is preserved over a S2a link may actually be negotiated between the WLAN provider and the PGW 176 to improve and/or optimize the method.

At S860, if the user equipment 120 does not connect to a wireless access point 110 connected to the TWAG 160, the method proceeds to S840 and repeats until the timer expires.

The timer may be shared between the AAA proxy 150 and the TWAG 160. For example, the AAA proxy 150 may initiate and start the timer and the TWAG 160 may check the timer used by the AAA proxy 150. Alternatively, the TWAG 160 may initiate and start the timer and the AAA proxy 150 may check the timer used by the TWAG 160. Finally, the timer may be external to both the AAA proxy 150 and the TWAG 160.

Figure 9A:
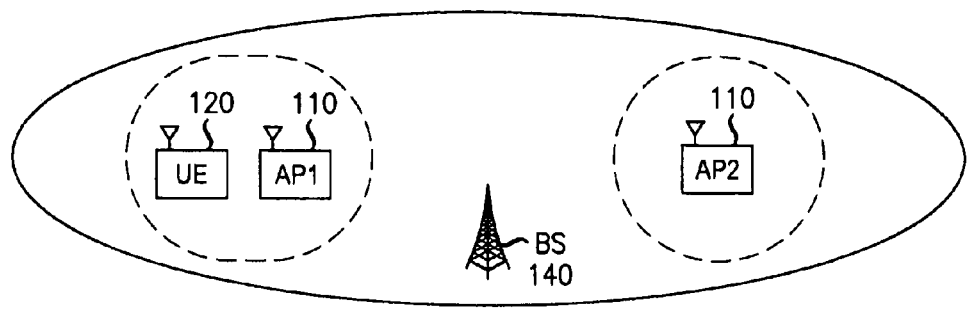
FIG. 9A-C illustrates user equipment moving from a coverage area of a first wireless access point, through a coverage area of a base station to a coverage area of a second wireless access point, according to some example embodiments.
Figure 9B:
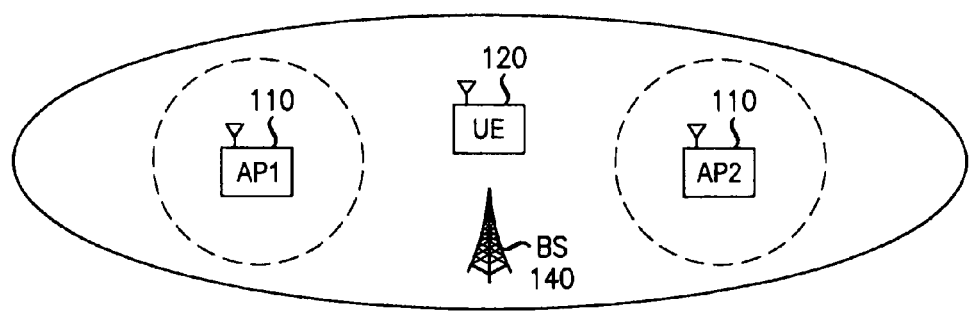
Figure 9C:
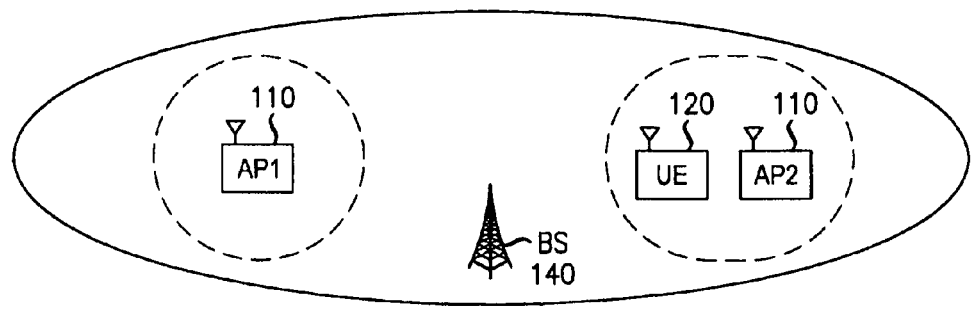

FIG. 9A-C illustrates user equipment 120 moving from a coverage area of a first wireless access point 110-1, through a coverage area of a base station 140 to a coverage area of a second wireless access point 110-2, according to some example embodiments FIG. 9A illustrates user equipment 120 being in a coverage area of a first wireless access point 110-1, according to some example embodiments. The user equipment 120 may connect to a first private network 130-1 associated with the first wireless access point 110-1, a Service Provider network 100 via the first wireless access point 110-1 or the Service Provider network 100 via a base station 140, based on authentication information transmitted from the user equipment 120.

FIG. 9B illustrates user equipment 120 in a coverage area of a base station 140, according to some example embodiments. In FIG. 9B, the user equipment 120 is outside of the coverage area of both the first wireless access point 110-1 and the second wireless access point 110-2. Therefore, the user equipment 120 cannot connect to the first private network 130-1 associated with the first wireless access point 110-1 or the second private network 130-2 associated with the second wireless access point 110-2. Instead, the user equipment 120 may only connect to the base station 140. If other wireless access points 110 are in range, the user equipment 120 may connect to the Service Provider network 100 via the other wireless access points 110. If other wireless access points 110 are not in range, the user equipment 120 may only connect to the base station 140.

FIG. 9C illustrates user equipment 120 being in a coverage area of a second wireless access point 110-2, according to some example embodiments. In FIG. 9C, the user equipment 120 is outside of the coverage area of the first wireless access point 110-1. Therefore, the user equipment 120 cannot connect to the first private network 130-1 associated with the first wireless access point 110-1. Instead, the user equipment 120 is in the coverage area of the second wireless access point 110-2 and may access a second private network 130-2 associated with the second wireless access point 110-2, based on the authentication information transmitted from the user equipment 120. In addition, the user equipment 120 may connect to the Service Provider network 100 via the second wireless access point 110-2 or may connect to the Service Provider network 100 via the base station 140, based on the authentication information stored in the user equipment 120.

As an example using FIGS. 9A-C, the user equipment 120 may transmit authentication information matching the authentication information for the Service Provider network 100. While in the coverage area of the first wireless access point 110-1, the user equipment 120 accesses the Service Provider network 100 via the first wireless access point 110-1 using the authentication information. As the user equipment 120 exits the coverage area of the first wireless access point 110-1, the user equipment 120 enters an area outside of a range of any wireless access point 110. Here, the user equipment 120 may connect to the base station 140. As the user equipment 120 enters the coverage area of the second wireless access point 110-2, the user equipment 120 may access the Service Provider network 100 via the second wireless access point 110-2 using the same authentication information used previously to connect to the Service Provider network 100 via the first wireless access point 110-1. If the user equipment 120 connects to the second wireless access point 110-2 prior to a timer expiring in a AAA proxy 150 or a TWAG 160, the user equipment 120 may benefit from fast re-authentication as the AAA proxy 150 can transmit a third key to the second wireless access point 110-2 without additional signaling to the AAA 172.

The user equipment 120 may be connected to the base station 140 while also being connected to the first wireless access point 110-1 or the second wireless access point 110-2. In addition, the user equipment 120 may be connected to the first wireless access point 110-1 and the second wireless access point 110-2 at the same time.

The user equipment 120 may maintain internet protocol (IP) continuity as the user equipment 120 connects from the first wireless access point 110-1 to the base station 140 or from the base station 140 to the second wireless access point 110-2.

It is assumed that the user equipment 120 moved from the first wireless access point 110-1 to the second wireless access point 110-2, as they are associated with the same Service Provider network 100. However, the user equipment 130 may move to the coverage area of the third wireless access point 110-3. While in the coverage area of the third wireless access point 110-3, the user equipment may only connect to the third private network 130-3. The third wireless access point 110-3 may be associated with a different service provider or may not be associated with the same AAA proxy 150 or Extended Service Set (ESS). Therefore, the third wireless access point 110-3 does not provide access to the Service Provider network 100.

While example embodiments have been particularly shown and described, it will be understood by one of ordinary skill in the art that variations in form and detail may be made therein without departing from the spirit and scope of the claims.

What is claimed is:
1. A method of operating a network, the method comprising:
   receiving, by an authentication, authorization and accounting (AAA) proxy of the network, authentication information for user equipment from a first wireless access point, the AAA proxy being a proxy for an authentication, authorization and accounting (AAA) server in a radiocommunication network;
   transmitting, by the AAA proxy, at least the received authentication information to the radiocommunication network;
   receiving, by the AAA proxy, first key information from the radiocommunication network;
   generating, by the AAA proxy, second key information based on the first key information and third key information based on the second key information;
   storing, by the AAA proxy, the first and second key information;
   transmitting, by the AAA proxy, the third key information to the first wireless access point, the third key information allowing the user equipment access to a network via the first wireless access point; and
   when the user equipment switches from the first wireless access point to a second wireless access point, transmitting, by the AAA proxy, the third key information to the second wireless access point without re-authenticating the user equipment with the AAA server.
2. The method of claim 1, further comprising:
   initializing and starting, by the AAA proxy, a timer upon receiving notice that the user equipment is no longer connected to the first wireless access point; and
   deleting, by the AAA proxy, the first key information if the timer expires.
3. The method of claim 1, further comprising:
   receiving, by the AAA proxy, the authentication information for the user equipment from the second wireless access point; and
   transmitting, by the AAA proxy, the third key information to the second wireless access point if the timer has not expired, the third key information allowing the user equipment access to the network via the second wireless access point.
4. The method of claim 1, further comprising:
   storing, by a wireless access gateway, IP connectivity data for the user equipment; and
   initializing and starting a timer, by at least one of the AAA proxy and the wireless access gateway, upon receiving notice that the user equipment is no longer connected to the first wireless access point.
5. The method of claim 4, further comprising:
   receiving, by the AAA proxy, the authentication information for the user equipment from the second wireless access point;
   transmitting, by the AAA proxy, the third key information to the second wireless access point if the timer has not expired, the third key information allowing the user equipment access to the network via the second wireless access point; and
   transmitting, by the wireless access gateway, the IP connectivity data to the user equipment via the second wireless access point if the authentication information for the user equipment is received from the second wireless access point and the timer is not expired, the IP connectivity data allowing the user equipment to maintain the same IP address.

6. A network, the network comprising:
an authentication, authorization and accounting (AAA) proxy configured to,
receive authentication information for user equipment from a first wireless access point,
transmit at least the received authentication information to an authentication, authorization and accounting (AAA) server in a radiocommunication network,
receive first key information from the AAA server in the radiocommunication network,
generate second key information based on the first key information and third key information based on the second key information,
store the first and second key information,
transmit the third key information to the first wireless access point, the third key information allowing the user equipment access to a network via the first wireless access point, the AAA proxy being a proxy for the AAA server in the radiocommunication network, and
when the user equipment switches from the first wireless access point to a second wireless access point, transmit, by the AAA proxy, the third key information to the second wireless access point without re-authenticating the user equipment with the AAA server.

7. The network of claim 6, wherein the AAA proxy is further configured to,
initialize and start a timer upon receiving notice that the user equipment is no longer connected to the first wireless access point, and
delete the first key information if the timer expires.

8. The network of claim 7, wherein the AAA proxy is further configured to,
receive the authentication information for the user equipment from the second wireless access point, and
transmit the third key information to the second wireless access point if the timer has not expired, the third key information allowing the user equipment access to the network via the second wireless access point.

9. The network of claim 6, further comprising:
a wireless access gateway configured to store IP connectivity data for the user equipment.

10. The network of claim 9, wherein,
the AAA proxy is configured to,
receive the authentication information for the user equipment from a second wireless access point,
transmit the third key information to the second wireless access point if the timer has not expired, the third key information allowing the user equipment access to the network via the second wireless access point, and
transmit the IP connectivity data to the user equipment via the second wireless access point if the authentication information for the user equipment is received from the second wireless access point and the timer is not expired, the IP connectivity data allowing the user equipment to maintain the same IP address.

11. A method of providing user equipment with access to a wireless access point, the method comprising:
sending, by the wireless access point, first authentication information for the user equipment to an authentication, authorization and accounting (AAA) proxy of a first network, the AAA proxy being a proxy for an authentication, authorization and accounting (AAA) server in a radiocommunication network, the radiocommunication network being separate from the first network;
receiving, by the wireless access point, key information from the AAA proxy if the first authentication information matches second authentication information stored in the AAA proxy., the receiving receives the key information from the AAA proxy faster compared to when the second authentication information is not stored in the AAA proxy; and
providing, by the wireless access point, the user equipment with access to the first network via the wireless access point upon receiving the key information, the wireless access point being part of the first network and the first network extending beyond the wireless access point.

12. The method of claim 11, further comprising:
notifying, by the wireless access point, the AAA proxy if the user equipment is no longer connected to the wireless access point.

13. The method of claim 11, further comprising:
communicating, by the wireless access point, with the AAA server in the radiocommunication network via the AAA proxy if the second authentication information for the user equipment is not stored in the AAA proxy, the radiocommunication network being separate from the first network.

14. The method of claim 11, further comprising:
receiving, by the wireless access point, IP connectivity from a wireless access gateway if the first authentication information matches the second authentication information stored in the AAA proxy.

15. The method of claim 11, further comprising:
providing, by the wireless access point, the user equipment with access to a second network if the wireless access point determines that the first authentication information for the user equipment matches third authentication information for the second network, the second network being associated with the wireless access point, the third authentication information being different than the second authentication information; and
restricting, by the wireless access point, access by the user equipment to the first network and the second network if the first authentication information for the user equipment does not match at least one of the second authentication information and the third authentication information.

16. A wireless access point configured to,
send first authentication information for user equipment to an authentication, authorization and accounting (AAA) proxy of a first network, the AAA proxy being a proxy for an authentication, authorization and accounting (AAA) server in a radiocommunication network, the radiocommunication network being separate from the first network,
receive key information from the AAA proxy if the first authentication information matches second authentication information, the wireless access point being configured to receive the key information from the AAA proxy faster compared to when the second authentication information is not stored in the AAA proxy, and
provide the user equipment with access to the first network via the wireless access point upon receiving the key information, the first network extending beyond the wireless access point.

17. The wireless access point of claim 16, further configured to notify the AAA proxy if the user equipment is no longer connected to the wireless access point.

18. The wireless access point of claim 16, further configured to communicate with the AAA server in the radiocommunication network via the AAA proxy if the second authentication information for the user equipment is not stored in the AAA proxy, the radiocommunication network being separate from the first network.

19. The wireless access point of claim 16, further configured to receive IP connectivity from a wireless access gateway if the first authentication information matches the second authentication information stored in the AAA proxy.

20. The wireless access point of claim 16, further configured to,
provide the user equipment with access to a second network if the wireless access point determines that the first authentication information for the user equipment matches third authentication information for the second network, the second network being associated with the wireless access point, the third authentication information being different than the second authentication information; and
restrict access by the user equipment to the first network and the second network if the first authentication information for the user equipment does not match at least one of the second authentication information and the third authentication information.

21. A method of operating a network, the method comprising:
receiving, by an authentication, authorization and accounting (AAA) proxy of the network, authentication information for user equipment from a wireless access point, the AAA proxy being a proxy for an authentication, authorization and accounting (AAA) server in a radiocommunication network;
generating, by the AAA proxy, key information based on stored key information associated with the user equipment; and
transmitting, by the AAA proxy, the key information to the wireless access point, the key information allowing the user equipment access to a network via the wireless access point,
wherein the AAA proxy does not transmit information to the AAA server in the radiocommunication network or receive second key information from the AAA server in the radiocommunication network.

22. A network, the network comprising:
an authentication, authorization and accounting (AAA) proxy configured to,
receive authentication information for user equipment from a wireless access point,
generate key information based on stored key information associated with the user equipment, and
transmit the key information to the wireless access point, the key information allowing the user equipment access to a network via the wireless access point, the AAA proxy being a proxy for an authentication, authorization and accounting (AAA) server in the radiocommunication network,
wherein the AAA proxy does not transmit information to the AAA server in the radiocommunication network or receive second key information from the AAA server in the radiocommunication network.

* * * * *